US007664100B2

(12) United States Patent
Nejah

(10) Patent No.: US 7,664,100 B2
(45) Date of Patent: Feb. 16, 2010

(54) VOICE-OVER-IP TELEPHONE DEVICES AND SYSTEMS

(75) Inventor: Allen Nejah, San Jose, CA (US)

(73) Assignee: SunMan Engineering, Inc., San Jose, CA (US)

( * ) Notice: Subject to any disclaimer, the term of this patent is extended or adjusted under 35 U.S.C. 154(b) by 851 days.

(21) Appl. No.: 11/200,564

(22) Filed: Aug. 9, 2005

(65) Prior Publication Data

US 2007/0036140 A1    Feb. 15, 2007

(51) Int. Cl.
*H04L 12/66* (2006.01)
(52) U.S. Cl. .................. 370/352; 370/342; 370/382; 370/401; 379/88.17; 379/93.01
(58) Field of Classification Search ............ 379/211.02, 379/93.15, 90.01, 93.05, 88.17, 93.01; 370/356, 370/467, 342, 352, 384, 401
See application file for complete search history.

(56) References Cited

U.S. PATENT DOCUMENTS

| 6,459,783 | B1 * | 10/2002 | March et al. ........... 379/211.02 |
| 6,763,020 | B1 * | 7/2004 | Hon ........................... 370/356 |
| 6,950,441 | B1 * | 9/2005 | Kaczmarczyk et al. ...... 370/467 |
| 7,120,139 | B1 * | 10/2006 | Kung et al. .................. 370/352 |
| 7,257,111 | B2 * | 8/2007 | Groves et al. ............... 370/352 |
| 7,428,234 | B2 * | 9/2008 | Forte-McRobbie et al. .. 370/352 |
| 7,483,417 | B2 * | 1/2009 | Farris et al. ................. 370/352 |
| 2003/0086411 | A1 * | 5/2003 | Vassilovski ................. 370/352 |
| 2004/0105432 | A1 | 6/2004 | Yamaji |
| 2005/0076149 | A1 | 4/2005 | McKown et al. |
| 2005/0135598 | A1 * | 6/2005 | Badt et al. ............. 379/265.09 |
| 2005/0249117 | A1 | 11/2005 | Gerkins |
| 2008/0043728 | A1 * | 2/2008 | Miloslavsky et al. ........ 370/352 |
| 2009/0109959 | A1 * | 4/2009 | Elliott et al. ................ 370/352 |

* cited by examiner

*Primary Examiner*—Gerald Gauthier
(74) *Attorney, Agent, or Firm*—Patent Law Group LLP; David C. Hsia

(57) ABSTRACT

A method for a service provider to provide telephone service between a first telephone and a second telephone includes connecting to the first telephone, receiving a request from the first telephone to make a call to the second telephone using a VoIP number, mapping the VoIP number to a PSTN number, determining a modem bank local to the second telephone, connecting to the modem bank, instructing the modem bank to connect to the second telephone using the PSTN number, and routing the call from the first telephone through the modem bank to the second telephone.

9 Claims, 5 Drawing Sheets

VOICE-OVER-IP TELEPHONE DEVICES AND SYSTEMS

CROSS REFERENCE TO RELATED APPLICATION

This application is related to U.S. patent application Ser. No. 11/077,261, filed on Mar. 5, 2005, entitled "Voice-Over-IP Device Using Dial-Up Modem," which is commonly assigned and incorporated herein by reference.

FIELD OF INVENTION

This invention relates to VoIP (Voice over Internet Protocol) telephone devices and services.

DESCRIPTION OF RELATED ART

There are many VoIP service providers, such as AT&T, Vonage, Lingo, BroadVoice, and Packet8. FIG. 1 illustrates a typical setup 100 available from these service providers. An analog telephone adapter (ATA) 102 is provided to the customer. ATA 102 has an RJ-11 phone port connected to an analog telephone 104. ATA 102 also has an RJ-45 network port connected to a router 106. Router 106 has RJ-45 network ports connected a personal computer 108 and a broadband modem 120 (e.g., a cable or a DSL modem). Broadband modem 120 is coupled through a network 122 (e.g., the Internet) to the network telephone service provider 124.

VoIP uses packet switching to open a brief connection to send the data necessary for the telephone conversation. VoIP allows several telephone calls to occupy the amount of space occupied by only one in a circuit-switched network.

BRIEF DESCRIPTION OF THE DRAWINGS

Use of the same reference numbers in different figures indicates similar or identical elements.

SUMMARY

In one embodiment of the invention, a method for a service provider to provide telephone service between a first telephone and a second telephone includes connecting to the first telephone, receiving a request from the first telephone to make a call to the second telephone using a Voice over Internet Protocol (VoIP) number, mapping the VoIP number to a public switching telephone network (PSTN) number, determining a modem bank local to the second telephone, connecting to the modem bank, instructing the modem bank to connect to the second telephone using the PSTN number, and routing the call from the first telephone through the modem bank to the second telephone.

DETAILED DESCRIPTION

VoIP (Voice over Internet Protocol) service providers require their customers to have broadband Internet access. However, many consumers cannot afford broadband Internet access. Furthermore, major telecommunication carriers have underutilized modem banks left over from the early days of the Internet where dial-up was the dominant way of accessing the Internet.

Users can dial 9-1-1 for emergency services on most VoIP phones. However, there are important differences between some VoIP 9-1-1 emergency dialing and traditional 9-1-1 service from a standard phone. Often the 9-1-1 call taker will not have a display of the number the user called from or the user's location. In addition, the call may arrive on a general access line in the call center instead of through the 9-1-1 system. Some VoIP service providers automatically provide 9-1-1 dialing service, some offer optional 9-1-1 dialing through registration, and some do not support 9-1-1 emergency dialing or other emergency functions. These service providers advise users to maintain an alternate means of accessing 9-1-1 service.

VoIP phones also require power to operate whereas the traditional telephones work even when the electricity goes out. This is because the traditional telephone still gets the power it needs through the phone line, and the phone company has an extensive battery system, as well as a backup generator, to supply power during a power failure.

Thus, a device and methods for operating the device are provided in accordance with the invention to take advantage of the efficiency of VoIP telephony and the abundance of traditional narrowband dial-up connection to the Internet, and to address the deficiencies of VoIP telephony.

Figure 1:
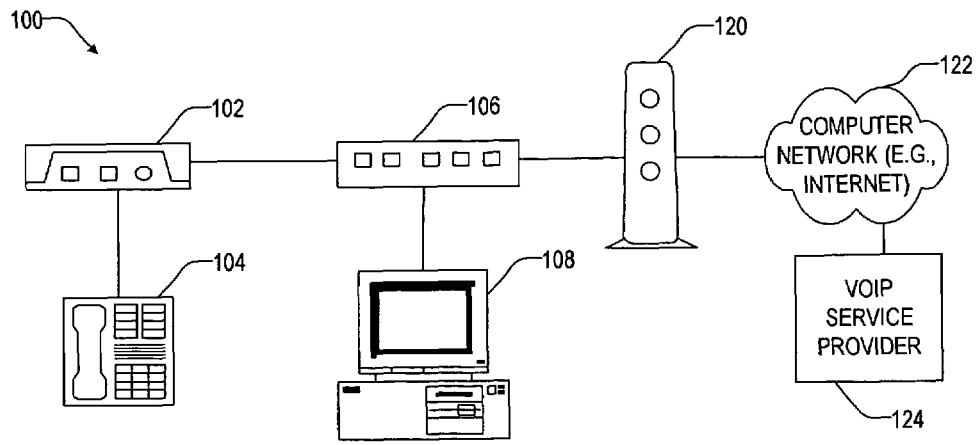
FIG. 1 illustrates a prior art network telephone system.
Figure 2:
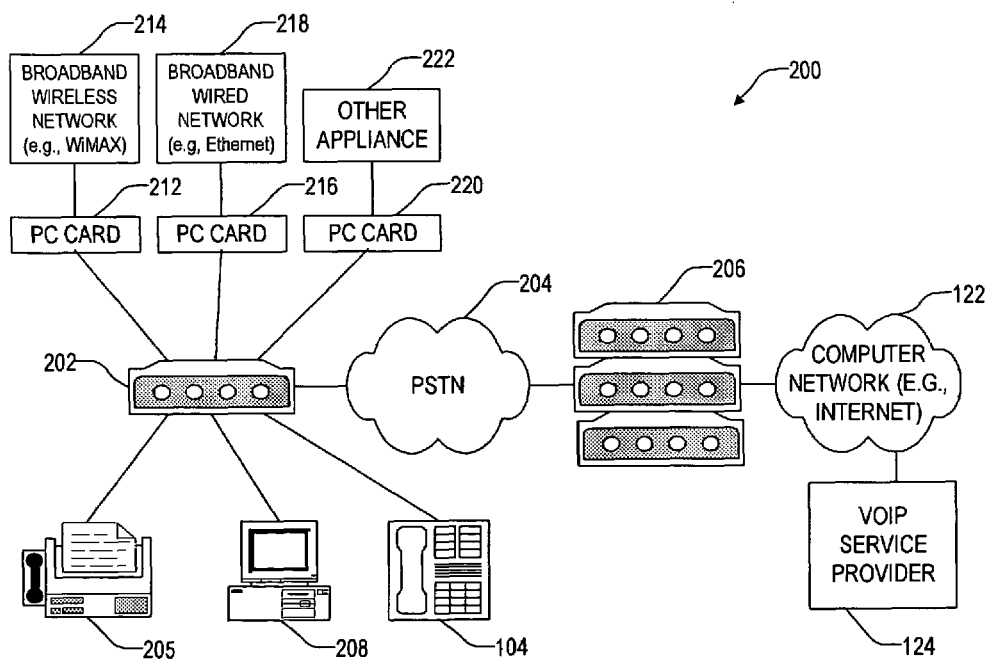
FIG. 2 illustrates a network telephone system in one embodiment of the present invention.

FIG. 2 illustrates a setup of a network telephone system 200 in one embodiment of the invention. System 200 includes a network telephone device 202 with a phone port connected to analog telephone 104 and another phone port connected to a public switching telephone network (PSTN) 204. Device 202 may include additional phone ports to couple to a facsimile machine 205 and additional analog telephones (not shown). Analog telephone 104 may be a corded or cordless telephone.

Device 202 uses an internal dial-up modem to connect to a modem bank 206. Modem bank 206 then connects device 202 to VoIP service provider 124. The connection may be direct if modem bank 206 and VoIP service provider 124 are a single entity or situated at the same location. If they are separate entities, then modem bank 206 connects device 202 through a network 122 (e.g., the Internet) to VoIP service provider 124.

To initiate a call, the user dials telephone 104 like any regular telephone. Device 202 takes the telephone number and sets up the telephone call through a narrowband dial-up connection to VoIP service provider 124. For the outgoing voice stream, device 202 compresses the voice stream, converts it into data packets, and sends the data packets by the narrowband dial-up connection. The data packets can be sent to VoIP service provider 124 or directly to the other party on the telephone call. For the incoming voice stream, device 202 receives the data packets through the narrowband dial-up connection, converts it to compressed voice data, and reverts the compressed voice data to the incoming voice stream.

When a call is received, device 202 first determines if the incoming call is a plain old telephone service (POTS) call or a VoIP call. If the incoming call is a POTS call, device 202 routes the call to analog telephone 104. If the incoming call is a VoIP call through a narrowband dial-up connection, device 202 handles the incoming and the outgoing voice streams as described above. If device 202 supports multiple VoIP lines, device 202 also routes the incoming VoIP call to the appropriate phone port.

In one embodiment, device 202 has PC card slots that accept PC cards for added functionalities. For example, the user can add a wireless PC card 212 to communicate with a wireless computer network 214. Wireless network 214 may be a Wi-Fi network or a WiMAX network that provides broadband wireless access to the Internet. Similarly, the user can add a network adapter PC card 216 to communicate with a wired computer network 218. Wired network 218 may be an Ethernet network that provides a broadband connection to the Internet. With either a wireless or wired connection to the Internet, device 202 can be used to surf the Internet. Furthermore, device 202 may be coupled by a PC card 220 to communicate with another device (e.g., another network telephone device or any other network household appliance). Device 202 can also act as a gateway/router for other devices to the Internet. For example, a personal computer 208 may be coupled to device 202 to access the Internet.

Figure 3:
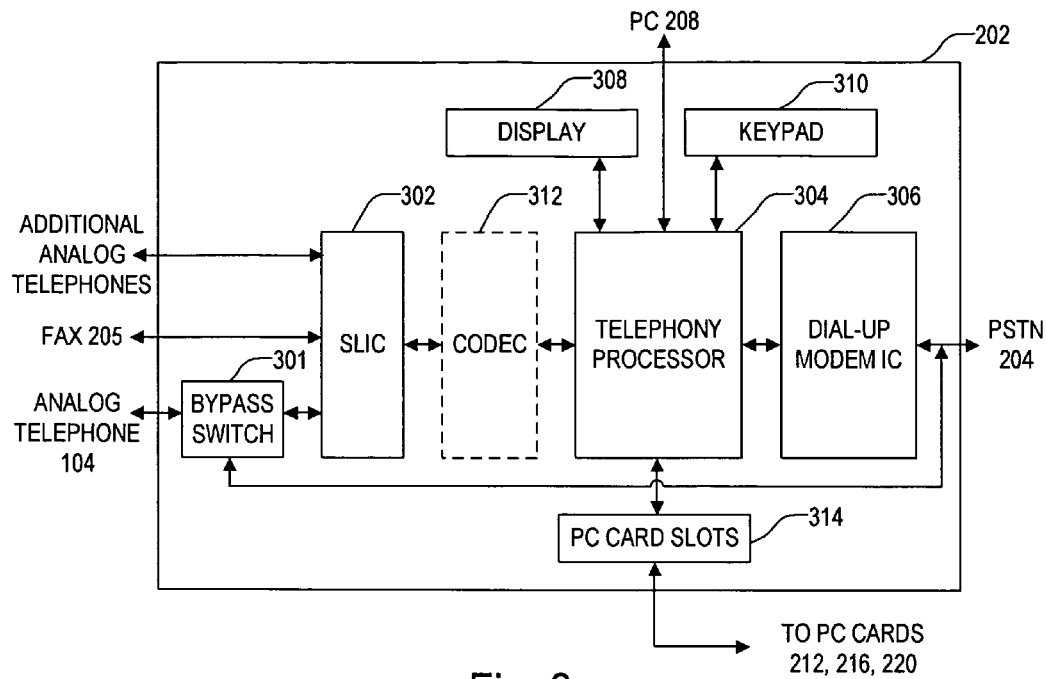
FIG. 3 illustrates a network telephone device in the system of FIG. 2 in one embodiment of the invention.

FIG. 3 illustrates a network telephone device 202 in one embodiment of the invention. Device 202 includes a bypass switch 301, a subscriber line/loop interface circuit (SLIC) 302 coupled to bypass switch 301, a telephony processor 304 coupled to SLIC 302, and a dial-up modem 306 coupled to telephony processor 304. Bypass switch 301 has a first port (e.g., a standard telephone port) for connecting to analog telephone 104, a second port connected to SLIC 302, and a third port for connecting to PSTN 204. Bypass switch 301 operates to couple analog telephone 104 to either SLIC 302 or PSTN 204. When bypass switch 301 couples analog telephone 104 to SLIC 302, device 202 operates in either (1) a digital telephone mode to provide VoIP calls or (2) an analog telephone mode to provide POTS calls during normal operations. When bypass switch 301 couples analog telephone 104 to PSTN 204, device 202 operates in an emergency mode to provide POTS calls during power failures.

SLIC 302 may further have ports for connecting to facsimile machine 205 and additional analog telephones. Dial-up modem 306 further has a port for connecting to PSTN 204. Note that dial-up modem 306 and bypass switch 301 share a common connection to PSTN 204. Telephony processor 304 further has ports for connecting to a display 308, a keypad 310, personal computer 208, and PC cards slots 314 for receiving PC cards 212, 216, and 220.

SLIC 302 converts 2-wire analog telephone signals from analog telephone 104 to outgoing 4-wire analog telephone signals destined for telephony processor 304. Vice versa, SLIC 302 converts incoming 4-wire analog telephone signals to the 2-wire analog telephone signals destined for analog telephone 104. SLIC 302 also provides other functions including battery feed, off-hook detection, and ringing for analog telephone 104. In one embodiment, SLIC 302 is an AG1170 from Silver Telecom of West Wales, United Kingdom.

In one embodiment, a coder-decoder (CODEC) 312 is coupled between SLIC 302 and telephony processor 304 to converts the outgoing 4-wire analog telephone signals from SLIC 302 to an outgoing digital audio stream destined for telephony processor 304. Vice versa, CODEC 312 converts an incoming digital audio stream from telephony processor 304 into the incoming 4-wire analog telephone signals. Alternatively, CODEC 312 is incorporated into telephony processor 304.

Telephony processor 304 converts the outgoing digital telephone signals from SLIC 302 into outgoing data packets destined for dial-up modem 306. Vice versa, telephony processor 304 converts incoming data packets from dial-up modem 306 into the incoming digital telephone signals destined for SLIC 302. Telephony processor 304 also performs voice compression, and calling processing and signaling according to the protocol accepted by VoIP service provider 124. In one embodiment, telephony processor 304 is a TNETV1050/1055 from Texas Instrument of Dallas, Tex.

Dial-up modem 306 converts the outgoing data packets into outgoing modem signals destined for modem bank 206. Vice versa, dial-up modem 306 converts incoming modem signals from modem bank 206 into the incoming data packets destined for telephony processor 304. Typically, dial-up modem 306 communicates at a speed of 56 kilobits per second (kbps). In one embodiment, dial-up modem 306 is a CX86500 from Conexant of Newport Beach, Calif.

Figure 4:
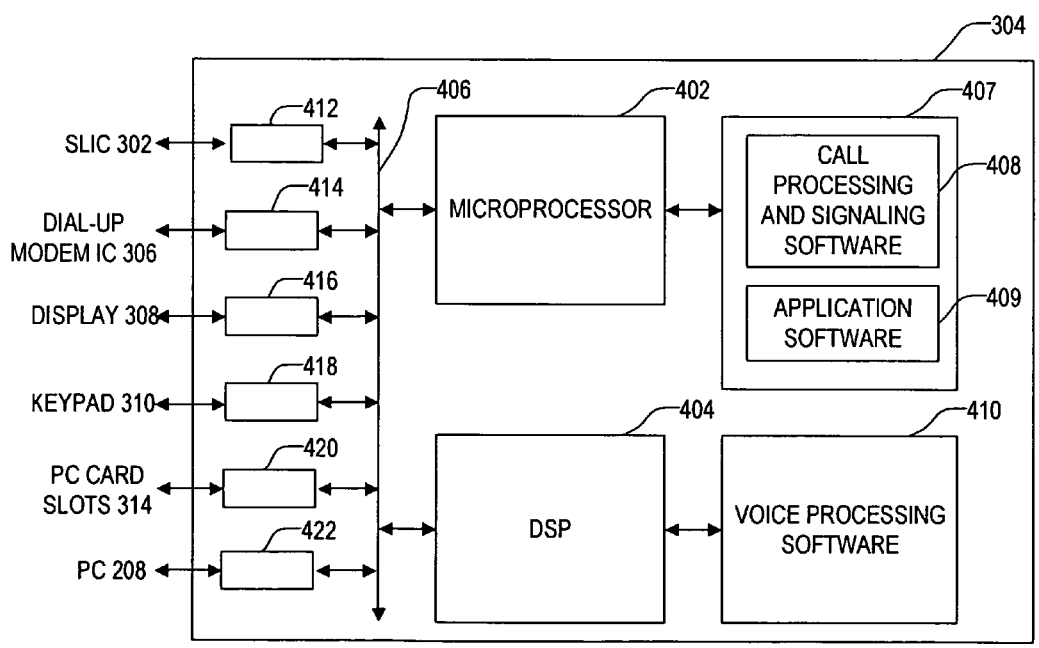
FIG. 4 illustrates a telephony processor in the network telephone device of FIG. 3 in one embodiment of the invention.

FIG. 4 illustrates telephony processor 304 in one embodiment of the invention. Processor 304 includes a microprocessor 402 and a digital signal processor (DSP) 404 connected by a system bus 406.

Microprocessor 402 is connected to a memory 407 that stores call processing and signaling software 408 and optional application software 409. Call processing and signaling software 408 handles standard VoIP protocols, such as H.323, H.323, and SIP. Optional application software 409 include a web browser, an email application, a photo sharing application, an instant messenger, and an Internet radio. Optional application software 409 further include a data service application that provides access to news, music downloads, weather, traffic, flight schedules, recipes, coupons, and stock quotes.

DSP 404 is connected to a memory 410 that stores voice processing software. The voice processing software handles voice compression using a standard CODEC such as G.729a.

System bus 406 is connected to a serial interface 412 for SLIC 302, a serial interface 414 for dial-up modem 306, a display controller 416 for display 308, a keypad interface 418 for keypad 310, PC card slot interface 420 for PC card slots 314, and an interface 422 for coupling to another device. In one embodiment, interface 422 is an Ethernet port for coupling to computer 208 to provide Internet access. In another embodiment, interface 422 is an Ethernet port for coupling to an additional network telephone device 202 to share the same narrowband dial-up connection.

To use network telephone device 202, the user simply plugs his or her analog telephone 104 to device 202, and device 202 to his or her telephone wall jack. In one embodiment, analog telephone 104 is integrated into device 202. Once turned on, device 202 determines a local access number to modem bank 206. Thereafter, device 202 is ready to dial modem bank 206 to initiate a VoIP telephone call and otherwise receive a VoIP telephone call from modem bank 206.

In one embodiment, the user can manually set network telephone device 202 in an analog mode to make a POTS call (e.g., by pressing a button). In response, analog telephone signals between analog telephone 104 and PSTN 204 are routed through SLIC 302, CODEC 312, telephony processor 304, and dial-up modem 306 for a traditional POTS call without any processing. In another embodiment, telephony processor 304 automatically sets device 202 in the analog mode when it intercepts the telephone number dialed by the user and determines that the telephone number is inside of the toll-free calling area of the user. Telephony processor 304 then instructs dial-up modem 306 to dial the telephone number before routing the analog telephone signals between analog telephone 104 and PSTN 204.

In one embodiment, the user can manually set network telephone device 202 in a digital mode to make a VoIP call (e.g., by pressing a button). In another embodiment, telephony processor 304 automatically sets device 202 in the digital mode when it intercepts the telephone number dialed by the user and determines the telephone number is outside of the toll-free calling area of the user. Telephony processor 304 then instructs dial-up modem 306 to connect to modem bank 206.

When connecting to modem bank 206, dial-up modem 306 bypasses the normal modem handshaking that determines the appropriate connection speed. This is because both modem 306 and modem bank 206 are preconfigured to operate at their highest speed (e.g., 56 kbps). Dial-up modem 306 may take additional steps to reduce the connection delay to modem bank 206 as described in "Internet Telephony and Modem Delay" by Bill Goodman, IEEE Network, May/June 1999. These steps help to provide a more enjoyable calling experience with minimum delay between dialing the telephone number and completing the VoIP call setup.

Once connected to modem bank 206, telephony processor 304 accesses VoIP service provider 124 to set up the VoIP telephone call according to the predetermined VoIP protocol. Once the two ends of the VoIP telephone call have been established, telephony processor 304 starts transmitting and receiving the VoIP data packets.

If the user later decides to get broadband service, the user can add PC cards 212 or 216 to device 202. Instead of using the narrowband dial-up connection, telephony processor 304 can then use either a broadband wireless or wired network connection to make the VoIP call as described above.

As described above, SLIC 302 converts outgoing analog telephone signals from analog telephone 104 into outgoing digital telephone signals destined for telephony processor 304. Telephony processor 304 compresses the digital telephone signals and then converts the compressed data into outgoing data packets destined for dial-up modem 306. Dial-up modem 306 converts the outgoing data packets into outgoing modem signals destined for modem bank 206. Dial-up modem 306 then sends the outgoing modem signals over PSTN 204 to modem bank 206, which then reverts the outgoing modem signals back to the outgoing data packets. Depending on the VoIP protocol, modem bank 206 routes the outgoing data packets to VoIP service provider 124 or directly to the other party on the VoIP telephone call through network 122.

Dial-up modem 306 also converts incoming modem signals from modem bank 206 into incoming data packets destined for telephony processor 304. Telephony processor 304 converts the incoming data packets into compressed data and then reverts the compressed data back to incoming digital telephone signals destined for SLIC 302. SLIC 302 then converts the incoming digital telephone signals to incoming analog telephone signals destined for analog telephone 104.

To receive a call, dial-up modem 306 intercepts the incoming call and determines if it is a POTS call or a VoIP call from modem bank 206. If the call is a POTS call, telephony processor 304 routes the analog telephone signals between PSTN 204 and analog telephone 104. If the call is a VoIP call through a narrowband dial-up connection, telephony processor 304 handles the call setup and then processes the incoming and outgoing streams as described above.

Along with voice streams, device 202 can also transmit and receive data streams. This is because the voice streams will only consume part of the bandwidth of dial-up modem 306. In one embodiment, the voice streams consume 24 to 30 kbps so that 9 to 19.2 kbps is available for data streams in a 33.2 to 56 kbps dial-up modem.

As described above, microprocessor 402 in device 202 may execute optional application software 409. Optional application software 409 include a web browser, an email application, a photo sharing application, an instant messenger, and an Internet radio. Thus, the data packets being transmitted between device 202 and modem bank 206 may include web pages, emails, images, instant messages, and music streams. Furthermore, optional application software 409 include a data service application that provides access to news, music downloads, weather, traffic, flight schedules, recipes, coupons, and stock quotes on network 122. Thus, the data packets being transmitted between device 202 and modem bank 206 may include news, music, weather report, traffic report, flight schedules, recipes, coupons, and stock quotes. The user can view these data items on display 308. The user can interact with optional application software 409 using keypad 310.

If the user later decides to get broadband service, the user can add PC cards 212 or 216 to device 202. Instead of using the narrowband dial-up connection, telephony processor 304 can then use either a broadband wireless or wired network connection to transmit and receive data streams via the Internet for the various optional application software described above.

Figure 5:
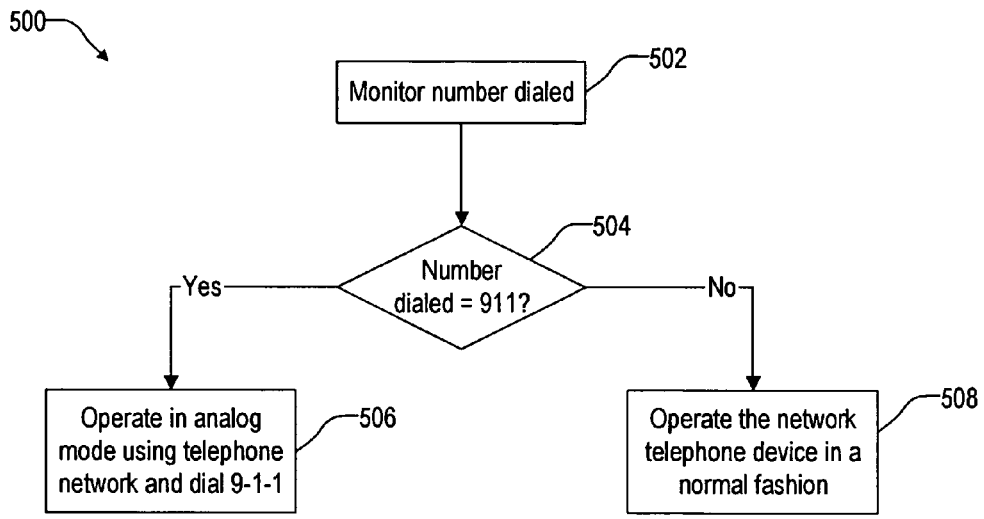
FIG. 5 illustrates a method for the network telephone device of FIG. 3 to dial for emergency services in one embodiment of the invention.

FIG. 5 illustrates a method 500 for network telephone device 202 to dial for emergency services in one embodiment of the invention.

In step 502, telephony processor 304 monitors a telephone number dialed by the user. Step 502 is followed by step 504.

In step 504, telephony processor 304 determines if the telephone number dialed is an emergency telephone number (e.g., 9-1-1). If so, step 504 is followed by step 506. Otherwise step 504 is followed by step 510.

In step 506, telephony processor 304 operates device 202 in the analog mode and instructs dial-up modem 306 to dial the emergency telephone number using PSTN 204. This allows the user of device 202 to quickly access local emergency services. As the call is made from PSTN 204, the emergency call center has access to the number the user is calling from and the user's location.

In step 508, telephony processor 304 operates device 202 normally in either the analog or the digital mode.

Figure 6:
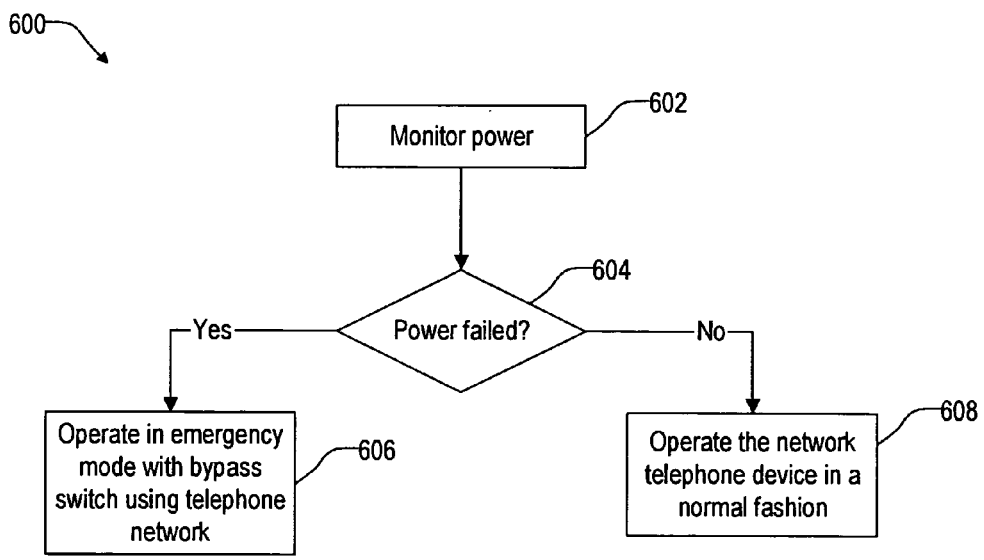
FIG. 6 illustrates a method for the network telephone device of FIG. 3 to dial during a power outage in one embodiment of the invention.

FIG. 6 illustrates a method 600 for network telephone device 202 to dial a telephone number during a power outage in one embodiment of the invention. To implement method 600 in one embodiment, bypass switch 301 connects analog telephone 104 to SLIC 302 when device 202 has power, and bypass switch 301 connects analog telephone 104 to PSTN 204 when device 202 loses power.

In step 602, bypass switch 301 monitors the power supply to device 202. Step 602 is followed by step 604.

In step 604, bypass switch 301 determines if the power has failed. If so, step 604 is followed by step 606. Otherwise step 604 is followed by step 608.

In step 606, bypass switch 301 connects analog telephone 104 to PSTN 204 so that the user can make POTS calls in the emergency mode when there is no power to device 202. This is because analog telephone 104 still receives power through the phone lines of PSTN 204 while the other components within device 202 are without power.

In step 608, device 202 operates normally in either the analog or the digital mode while bypass switch 301 connects analog telephone 104 to SLIC 302.

Figure 7:
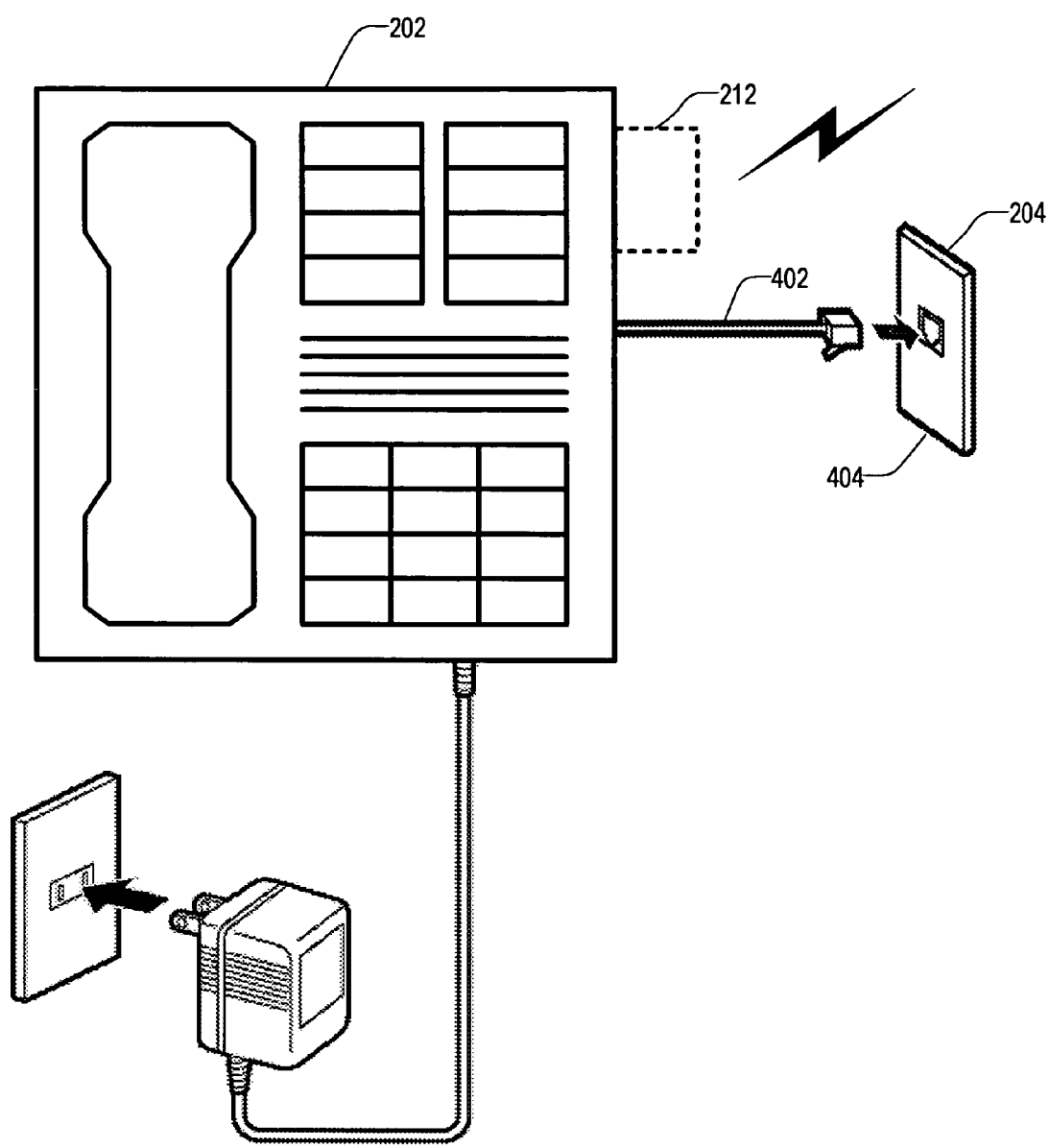
FIG. 7 illustrates the appearance of a network telephone device of FIG. 3 in one embodiment of the invention.

FIG. 7 shows the appearance of network telephone device 202 in one embodiment of the invention. In this embodiment, an analog telephone is integrated into device 202 so that device 202 looks like a traditional telephone. Although shown with a corded handset, device 202 may have a cordless handset. After purchase, a user simply plugs a telephone cord 402 to a wall jack 404 to access PSTN 204. Device 202 then operates in either the analog mode like a traditional telephone to make POTS calls or the digital mode by using a narrowband dial-up connection to make VoIP calls. Furthermore, device 202 includes a PC card slot that accepts wireless PC card 212 to access a wireless network.

Figure 8:
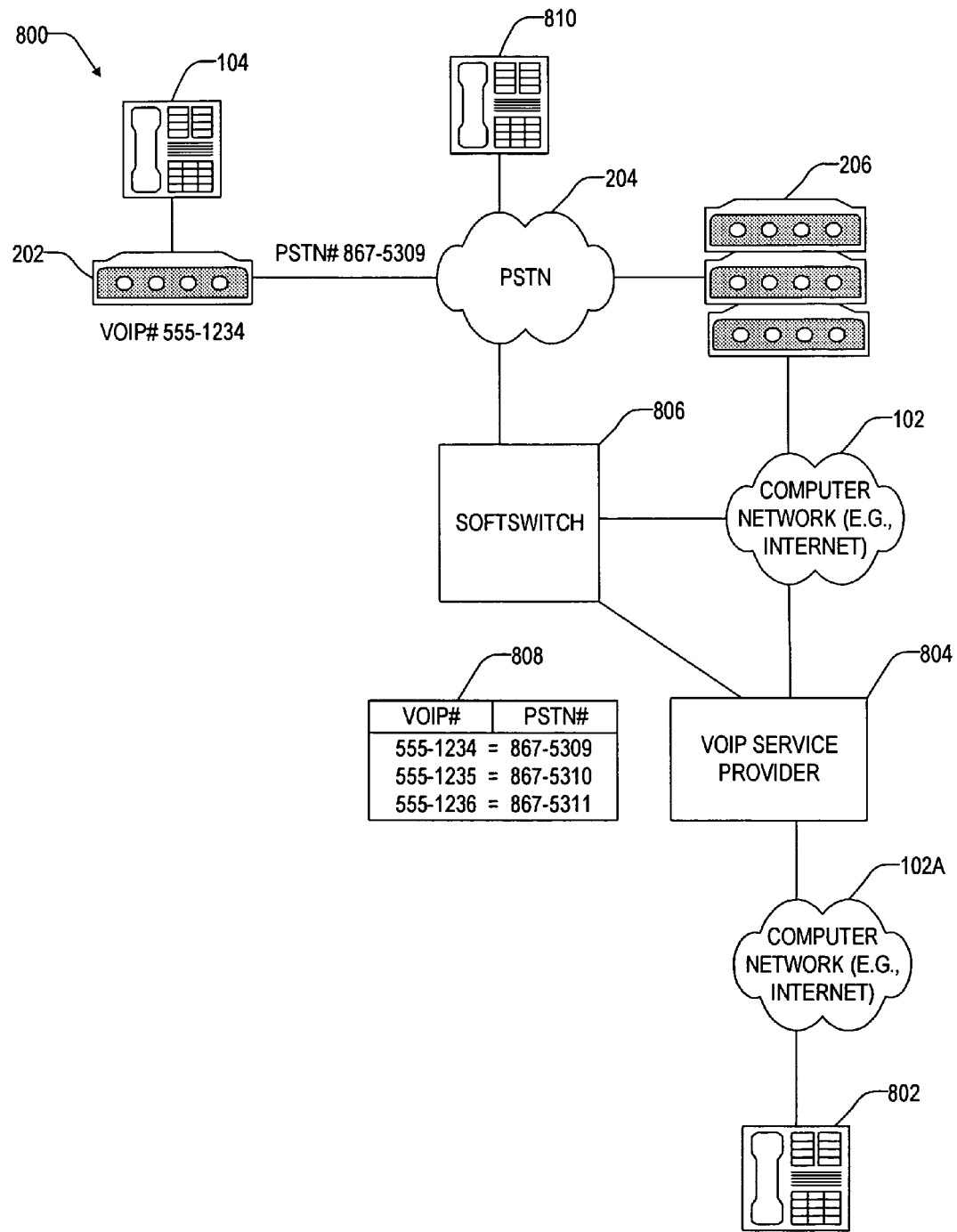
FIG. 8 illustrates another network telephone system in one embodiment of the present invention.

FIG. 8 illustrates a setup of a network telephone system 800 in one embodiment of the invention. As described above, device 202 is connected to a PSTN 204 and has a PSTN telephone number (e.g., 867-5309) for POTS service through PSTN 204. In system 800, device 202 is further assigned a VoIP telephone number (e.g., 555-1234) for VoIP telephone service through VoIP service provider 804.

A VoIP telephone 802 is connected through compute network 102A (e.g., the Internet) to a VoIP service provider 804. VoIP service provider 804 can be connected to device 202 through computer network 102 (e.g., the Internet), modem bank 206, and PSTN 204. Alternatively, VoIP service provider 804 can be connected to device 202 through a softswitch 806 and PSTN 204. VoIP service provider 804 may be connected directly to softswitch 806 or over computer network 102 (e.g., the Internet).

A traditional telephone 810 is connected to PSTN 204. Traditional telephone can be connected to device 202 through PSTN 204. Alternatively, traditional telephone 810 can be connected to device 202 through PSTN 204, softswitch 806, VoIP service provider 804, and back through softswitch 806 and PSTN 204 to device 202.

System 800 is explained in exemplary calls from a first user at VoIP phone 802 to a second user at device 202. To make a call to the second user using the VoIP number, the first user dials the VoIP number using VoIP phone 802. VoIP phone 802 connects to VoIP service provider 804 over computer network 102A and provides the VoIP number to VoIP service provider 804. Using a table 808, VoIP service provider 804 maps the VoIP number to the corresponding PSTN number at device 202. After determining the corresponding PSTN number, VoIP service provider 804 determines a modem bank 206 that is local to device 202 (e.g., within a toll-free calling area of device 202). VoIP service provider 804 then connects to modem bank 206 over computer network 102 and instructs modem bank 206 to dial up device 202 over PSTN 204. VoIP service provider 804 then routes the call through modem bank 206 to device 202 as described above.

To make a call to the second user using the PSTN number, the first user dials the PSTN number using VoIP phone 802. VoIP phone 802 provides the PSTN number to VoIP service provider 804. VoIP service provider 804 routes the call through a softswitch 806. Softswitch 806 then connects to device 202 through PSTN 204. Although not shown, softswitch 806 may include the software and hardware necessary to convert the data packets from VoIP service provider 804 to voice data for PSTN 204.

System 800 is explained in exemplary calls from a first user at a traditional phone 810 to a second user at device 202. To make a call to the second user using the VoIP number, the first user dials the VoIP number using traditional telephone 810. After receiving the VoIP number, PSTN 204 routes the call through softswitch 806 to VoIP service provider 805. Using table 808, VoIP service provider 804 maps the VoIP number to the corresponding PSTN number at device 202. After determining the corresponding PSTN number, VoIP service provider 804 routes the call back through softswitch 806 and PSTN 204 to complete the call to device 202.

To make a call to the second user using the PSTN number, the first user dials the PSTN number using traditional telephone 810. PSTN 204 then routes the call to device 202 like any POTS call.

Various other adaptations and combinations of features of the embodiments disclosed are within the scope of the invention. Numerous embodiments are encompassed by the following claims.

What is claimed is:

1. A method for a network telephone service provider to provide telephone service between a first telephone device and a second telephone device, comprising:
   connecting to the first telephone device;
   receiving a request from the first telephone device to make a call to the second telephone device using a first telephone number of the second telephone device;
   mapping the first telephone number to a second telephone number of the second telephone device;
   determining a modem bank local to the second telephone device;
   connecting to the modem bank;
   instructing the modem bank to connect to the second telephone device using the second telephone number; and
   routing the call from the first telephone device through the modem bank to the second telephone device.

2. The method of claim 1, wherein the first telephone number is a Voice over Internet Protocol (VoIP) telephone number of the second telephone device and the second telephone number is a public switching telephone network (PSTN) telephone number of the second telephone device.

3. The method of claim 1, wherein said connecting to the first telephone device comprises a connection over a computer network.

4. The method of claim 1, wherein said connecting to the modem bank comprises a connection over a computer network.

5. The method of claim 1, wherein said routing the call comprises communicating data packets with voice data between the first telephone device and the second telephone device.

6. The method of claim 1, wherein the modem bank is local to the second telephone device when the modem bank is within a toll-free calling area of the second telephone device.

7. The method of claim 2, further comprising:
   receiving another request from the first telephone device to make a plain old telephone service (POTS) call to the second telephone device using the second telephone number;
   connecting to a softswitch;
   routing the POTS call from the first telephone device through the softswitch to the second telephone device.

8. The method of claim 7, wherein said connecting to the first telephone device comprises a connection over a computer network.

9. The method of claim 7, wherein said connecting to a softswitch comprises a connection over a computer network.

* * * * *